(12) United States Patent
Shen et al.

(10) Patent No.: US 11,353,242 B2
(45) Date of Patent: Jun. 7, 2022

(54) SEMI-OPEN HIGH-TEMPERATURE HEAT PUMP SYSTEM AND WORKING METHOD THEREOF

(71) Applicant: JIANGSU UNIVERSITY OF SCIENCE AND TECHNOLOGY, Zhenjiang (CN)

(72) Inventors: Jiubing Shen, Zhenjiang (CN); Zhichao Li, Zhenjiang (CN); Yuping Chen, Zhenjiang (CN); Siyuan Yan, Zhenjiang (CN); Jinjin Xu, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 17/427,318

(22) PCT Filed: Dec. 24, 2020

(86) PCT No.: PCT/CN2020/138772
§ 371 (c)(1),
(2) Date: Jul. 30, 2021

(87) PCT Pub. No.: WO2021/184869
PCT Pub. Date: Sep. 23, 2021

(65) Prior Publication Data
US 2022/0042717 A1 Feb. 10, 2022

(30) Foreign Application Priority Data

Mar. 17, 2020 (CN) .......................... 202010185600.5

(51) Int. Cl.
*F24H 4/02* (2022.01)
*F25B 41/22* (2021.01)
(Continued)

(52) U.S. Cl.
CPC ............ *F24H 4/02* (2013.01); *F24H 9/0005* (2013.01); *F24H 9/1809* (2013.01);
(Continued)

(58) Field of Classification Search
CPC ........ F24H 4/02; F24H 9/0005; F24H 9/1809; F24H 9/2007; F25B 41/22; F25B 39/04; F25B 2339/047
See application file for complete search history.

(56) References Cited

U.S. PATENT DOCUMENTS

2011/0132008 A1* 6/2011 Su .......................... F25B 15/02
62/119

FOREIGN PATENT DOCUMENTS

| CN | 202382475 U | 8/2012 |
|---|---|---|
| CN | 103884097 A | 6/2014 |

(Continued)

OTHER PUBLICATIONS

International Search Report issued in corresponding International Application No. PCT/CN2020/138772; dated Mar. 19, 2021; State Intellectual Property Office of the P.R. China, Beijing, China, 4 pgs.
(Continued)

*Primary Examiner* — Ana M Vazquez
(74) *Attorney, Agent, or Firm* — Hauptman Ham, LLP

(57) ABSTRACT

A semi-open high-temperature heat pump system including a compressor, a direct-contact condenser, a heat exchanger, an evaporator, a water purifier, a cold water pump, a hot water pump, a circulating water pump, and a vacuum pump. A discharge port of the compressor is connected to the direct-contact condenser, the direct-contact condenser is connected to the evaporator via the heat exchanger, and the evaporator is connected to a gas suction port of the compressor via a gas vent on its top. An outlet of the water purifier is separately connected to the compressor, the direct-contact condenser, and the evaporator via the cold water pump. An outlet at the bottom of the evaporator is connected to the direct-contact condenser via the circulating water pump. The vacuum pump is connected above the direct-contact condenser, and the hot water pump is connected below the direct-contact condenser.

10 Claims, 1 Drawing Sheet

(51) Int. Cl.
      *F24H 9/00*           (2022.01)
      *F24H 9/1809*      (2022.01)
      *F25B 39/04*        (2006.01)
      *F24H 9/20*         (2022.01)

(52) U.S. Cl.
      CPC ........... *F24H 9/2007* (2013.01); *F25B 39/04* (2013.01); *F25B 41/22* (2021.01); *F25B 2339/047* (2013.01)

(56) References Cited

FOREIGN PATENT DOCUMENTS

| | | |
|---|---|---|
| CN | 103954068 A | 7/2014 |
| CN | 107192171 A | 9/2017 |
| CN | 109612159 A | 4/2019 |
| CN | 111306787 A | 6/2020 |
| JP | 2019206932 A | 12/2019 |

OTHER PUBLICATIONS

Written Opinion issued in corresponding International Application No. PCT/CN2020/138772; dated Mar. 19, 2021; State Intellectual Property Office of the P.R. China, Beijing, China, 9 pgs.

\* cited by examiner

SEMI-OPEN HIGH-TEMPERATURE HEAT PUMP SYSTEM AND WORKING METHOD THEREOF

RELATED APPLICATIONS

The present application is a U.S. National Phase of International Application Number PCT/CN2020/138772, filed Dec. 24, 2020, and claims the priority of Chinese Application No. 202010185600.5, filed Mar. 17, 2020.

TECHNICAL FIELD

The present invention relates to a semi-open high-temperature heat pump system, which belongs to the technical field of energy utilization and recovery.

BACKGROUND

Since the 21st century, China has paid more attention to reducing environmental pollution and energy waste in industrial production. Relevant data shows that China's total industrial waste heat resources account for 17% to 67% of the total consumption. Moreover, the recovery rate of waste heat at the present stage in China is less than 30%, which is obviously lower than the recovery rate of the waste heat in developed countries, resulting in a huge energy waste every year. Therefore, it is necessary for China to fully develop the field of waste heat recovery and reduce energy waste at the present stage.

A heat pump is a high-efficiency energy-saving device that fully recovers low-grade thermal energy. However, the current heat pump system which mainly uses chlorofluorocarbon as the circulating working fluid has certain problems. On the one hand, there are environmental problems such as ozone layer depletion and greenhouse effect; on the other hand, limited by the critical temperature, the system is unlikely to achieve a heating temperature above 90° C.

As a natural working fluid, water has non-toxic, environmentally friendly and efficient features, and its critical temperature is as high as 374.3° C., making it an ideal working fluid for high-temperature heat pumps. However, water, as a circulating working fluid, also has problems such as a large volume flow and a high compressor discharge temperature. Moreover, in the case of closed circulation, in order to ensure the quality of the circulating water, the evaporator and the condenser neither can use a contact heat exchanger, which undoubtedly increases the thermal resistance and reduces the circulation efficiency of the system. Further, a heat pump system using water as the circulating working fluid has technical problems such as freezing of the circulating working fluid under a non-operating condition in winter. Therefore, it is particularly necessary to develop a novel high-temperature heat pump system using water as the circulating working fluid.

SUMMARY

The present invention aims to solve the foregoing problems and deficiencies in the prior art, and provide a semi-open high-temperature heat pump system using water as a circulating working fluid and a working method thereof.

By using water as the circulating working fluid and industrial waste heat as a driving thermal source, the present invention improves the heat exchange efficiency of a heat exchanger, reduces a heat transfer temperature difference, and increases the recovery amount of the waste heat by use of a direct-contact condenser, thus raising the temperature of finally output hot water.

To achieve the foregoing objectives, the present invention adopts the following technical solutions to solve the foregoing problems:

A semi-open high-temperature heat pump system includes: a compressor 1, a direct-contact condenser 2, a heat exchanger 3, an evaporator 4, a water purifier 5, a cold water pump 6, and a hot water pump 7, where a filter screen 2a, a spray pipe 2b, a packing 2c, a steam pipe 2d, and an electric heater 2e are successively disposed from top to bottom in the direct-contact condenser 2; a twelfth valve 28 and a vacuum pump 9 are sequentially connected at the top of the direct-contact condenser via a pipe; an outlet a of the compressor 1 is sequentially connected to a first valve 17 and an inlet b of the steam pipe 2d of the direct-contact condenser 2 via a pipe; an outlet c at the bottom of the direct-contact condenser 2 is sequentially connected to a second valve 18, the hot water pump 7, and a first one-way valve 33 via a pipe to realize output to the outside; an outlet d at the bottom of the direct-contact condenser 2 is connected to a third valve 19 and then to an inlet e of the heat exchanger 3 via a pipe; an outlet f of the heat exchanger 3 is sequentially connected to a fourth valve 20 and a first throttle valve 10 and then to an inlet g of the evaporator 4 via a pipe; and a steam outlet i on the top of the evaporator 4 is connected to a sixth valve 22 and then to an inlet j of the compressor 1 via a pipe.

An outlet of the water purifier 5 is sequentially connected to a seventh valve 23, the cold water pump 6, and a second one-way valve 34 via a pipe, and is then branched into three paths, where one path passes through an eighth valve 24, a third one-way valve 35, and a first control valve 13, and is then connected to a water jet orifice k of the compressor 1; another path passes through a ninth valve 25 and a fourth one-way valve 36 and is connected to an inlet m of the heat exchanger 3; an outlet n of the heat exchanger 3 is connected to an inlet o of the spray pipe 2b of the direct-contact condenser 2 through a second control valve 14 and a tenth valve 26; and the third path passes through an eleventh valve 27, a fifth one-way valve 37, and a second throttle valve 11, and is connected to an inlet p on the top of the evaporator 4.

An outlet q at the bottom of the evaporator 4 is sequentially connected to a thirteenth valve 29, a circulating water pump 8, and a sixth one-way valve 38 and then to the inlet b of the steam pipe 2d of the direct-contact condenser 2 via a pipe; and a right end is connected to an inlet r of the evaporator 4 via a driving thermal source pipe successively through a filter 32 and a fourteenth valve 30; and an outlet s of the evaporator 4 outputs a driving thermal source through a fifteenth valve 31.

Further preferably, a safety valve 15 and a non-condensable gas vent control valve 16 are disposed on the top of the direct-contact condenser 2.

Further preferably, a fifth valve 21 and a capillary tube 12 are successively disposed between the outlet f of the heat exchanger 3 and an inlet h of the evaporator 4 via a pipe.

Further preferably, the evaporator 4 is a shell-and-tube flooded evaporator in which circulating working water of the system flows through a shell side; and the heat exchanger 3 is a plate heat exchanger or a tube-fin heat exchanger.

Further preferably, the first valve 17 to the fifteenth valve 31 are all solenoid valves, plunger type globe valves, or gate valves.

To achieve the foregoing objectives, another technical solution used by the present invention to solve the foregoing problems is as follows:

A working method of a semi-open high-temperature heat pump system includes four working phases: A. system evacuation and filling process, B. system startup and normal operation, C. system shutdown, and D. system freeze prevention.

A. System Evacuation and Filling Process

A first valve, a third valve, a fourth valve, a sixth valve, and a twelfth valve are opened simultaneously, and a vacuum pump is turned on to evacuate the system to a negative pressure therein so as to reduce an evaporation temperature during operation of the system. When the pressure in the direct-contact condenser meets the requirement, the vacuum pump is turned off and the twelfth valve is closed, to maintain a stable internal pressure of the system.

A cold water pump is turned on, and a seventh valve and an eleventh valve are opened, so that circulating working water treated by a water purifier flows through the seventh valve and the eleventh valve, then is throttled and depressurized by a second throttle valve, and is finally charged to an evaporator from an inlet p on the top of the evaporator, so as to maintain the pressure in the evaporator unchanged. The cold water pump is turned off and the seventh valve and the eleventh valve are closed when the circulating working fluid is sufficient, thus completing filling the system with the circulating working fluid.

B. System Startup and Normal Operation

After completion of system evacuation and filling, a fourteenth valve and a fifteenth valve are opened, so that industrial waste heat passes through a filter and the fourteenth valve along a driving thermal source pipe and enters the evaporator from an evaporator tube inlet r of the evaporator; and after heat exchange with the circulating working fluid, is discharged through the fifteenth valve from an evaporator tube outlet s of the evaporator. A compressor is turned on, so that water vapor flows from an outlet i on the top of the evaporator, passes through the sixth valve, and enters the compressor from a suction port j of the compressor to be compressed. The compressed water vapor is discharged from a discharge port a of the compressor, passes through the first valve, enters the direct-contact condenser from an inlet b of the steam pipe $2d$, and is ejected into the direct-contact condenser via gas vents at the two sides of the steam pipe $2d$. After the pressure in the direct-contact condenser reaches a required value, the system enters a normal operation state. The cold water pump and a hot water pump are turned on, and a second valve, a seventh valve, an eighth valve, a ninth valve, and a tenth valve are opened. After the working water treated by the water purifier passes through the seventh valve and the cold water pump, part of the water is ejected into the compressor from a water jet orifice k of the compressor through the eighth valve and a first control valve, so as to reduce an discharge superheat degree of the compressor and further increase a steam production. Another part of the water enters a heat exchanger from an inlet m of the heat exchanger through the ninth valve and then flows out from an outlet n of the heat exchanger; and is then ejected from an inlet o of a spray pipe into the direct-contact condenser through a second control valve and the tenth valve to conduct contact heat-mass exchange with the high-temperature water vapor discharged from the steam pipe $2d$, to finally form high-temperature water. Part of the high-temperature water in the direct-contact condenser provides heat to the outside through the second valve and the hot water pump via an outlet c at the bottom of the direct-contact condenser. Another part of the high-temperature water is discharged from an outlet d at the bottom of the direct-contact condenser; passes through the third valve, the heat exchanger, and the fourth valve; is throttled and depressurized by a first throttle valve; and finally enters the evaporator from an inlet g on the top of the evaporator, to realize circulation.

C. System Shutdown

The compressor is turned off; and the first valve, the third valve, the fourth valve, the sixth valve, the eighth valve, the fourteenth valve, and the fifteenth valve are closed, so that the working fluid does not circulate in the system, and a low-temperature thermal source is no longer provided. The cold water pump and the hot water pump continuously work and absorb the waste heat in the direct-contact condenser. After the temperature in the direct-contact condenser is reduced to a certain temperature, the cold water pump and the hot water pump are turned off, and the second valve, the seventh valve, the ninth valve, and the tenth valve are closed, so that the system stops operation.

D. System Freeze Prevention

When the system shuts down and the ambient temperature is too low, an electric heater $2e$ in the direct-contact condenser and a circulating water pump are turned on, and the third valve, the fifth valve, and the thirteenth valve are opened, so that the working water in the evaporator is discharged from an outlet q at the bottom of the evaporator, then passes through the thirteenth valve and the circulating water pump, enters the direct-contact condenser from the inlet b of the steam pipe $2d$, and is discharged through the gas vents at the two sides of the steam pipe $2d$. The working water in the direct-contact condenser is discharged from the outlet d at the bottom of the direct-contact condenser, passes through the third valve and the fifth valve, is throttled and depressurized by a capillary tube, and then enters the evaporator from an inlet h on the top of the evaporator, so as to maintain the internal pressure of the evaporator and realize circulation. In this way, the circulating working water in the system is in a flow state, thus avoiding damage to the system due to freezing of the circulating working fluid.

Further, an opening degree of the first control valve ahead of the water jet orifice k of the compressor is adjusted in direct proportion to a superheat degree of the discharge port a of the compressor, so as to maintain the exhaust superheat degree of the compressor at a relatively low level and further increase a gas exhaust volume of the compressor.

Further, the spraying volume is adjusted and controlled by the second control valve. An opening degree of the second control valve is adjusted in direct proportion to the temperature of the working water in the bottom portion of the direct-contact condenser, so as to maintain a constant water temperature in the direct-contact condenser. An opening degree of the non-condensable gas vent control valve is adjusted in direct proportion to the pressure in the direct-contact condenser.

Further, the cold water pump and the hot water pump are both variable frequency pumps, and a method for adjusting the frequency or flow of the cold water pump and the hot water pump is adjustment in a linked manner. That is, when the frequency or flow of the hot water pump increases, the frequency or flow of the cold water pump also increases accordingly. The frequency of the hot water pump is adjusted in direct proportion according to a demand supply for hot water.

Further, when the system is in normal operation, the power of the electric heater $2e$ in the direct-contact condenser is adjusted in direct proportion according to a difference value between a set temperature and an actual temperature of the hot water in the direct-contact condenser. When the system is in freeze prevention operation, the power of the electric heater 2e in the direct-contact condenser is adjusted in inverse proportion according to the water temperature in the direct-contact condenser.

Compared to the prior art, the technical solutions of the present invention have the following advantages and beneficial effects:

The present invention recovers waste hot water discharged from industrial production as a driving thermal source, and uses water as the circulating working fluid, thus achieving energy conservation and environmental protection and conforming to the contemporary social pattern of sustainable development. The system uses a semi-open heat pump and takes a contact heat exchanger as the system condenser, to carry out heat-mass exchange by means of direct-contact heat transfer, thus greatly reducing thermal resistance and decreasing a heat transfer temperature difference, so that the recovered heat can be fully utilized and the preparation efficiency can be improved. When the temperature of the waste heat in the industrial production is relatively low, the system can perform auxiliary electric heating according to a required hot water temperature, rendering the temperature of the hot water output by the system constant. By cooperation of the circulating water pump and the electric heater, the working fluid is avoided from freezing in a non-operating state of the heat pump system using water as the circulating working fluid in winter.

The present invention has a simple structure and is easy to operate; and can improve the heat transfer efficiency, decrease a heat transfer temperature difference, and increase the recovery amount of the waste heat, thus raising the temperature of finally output hot water.

1. Compressor, 2. Direct-contact condenser, 2a. Filter screen, 2b. Spray pipe, 2c. Packing, 2d. Steam pipe, 2e. Electric heater, 3. Heat exchanger, 4. Evaporator, 5. Water purifier, 6. Cold water pump, 7. Hot water pump, 8. Circulating water pump, 9. Vacuum pump, 10. First throttle valve, 11. Second throttle valve, 12. Capillary tube, 13. First control valve, 14. Second control valve, 15. Safety valve, 16. Non-condensable gas vent control valve, 17. First valve, 18. Second valve, 19. Third valve, 20. Fourth valve, 21. Fifth valve, 22. Sixth valve, 23. Seventh valve, 24. Eighth valve, 25. Ninth valve, 26. Tenth valve, 27. Eleventh valve, 28. Twelfth valve, 29. Thirteenth valve, 30. Fourteenth valve, 31. Fifteenth valve, 32. Filter, 33. First one-way valve, 34. Second one-way valve, 35. Third one-way valve, 36. Fourth one-way valve, 37. Fifth one-way valve, 38. Sixth one-way valve.

DETAILED DESCRIPTION OF THE EMBODIMENTS

To make the foregoing objectives, technical solutions, and advantages of the present invention clearer and more comprehensible, the present invention is further described in detail below with reference to the accompanying drawings and specific embodiments. It should be noted that, the specific embodiments described herein are merely used to explain the present invention, and are not intended to limit the present invention.

Figure 1:
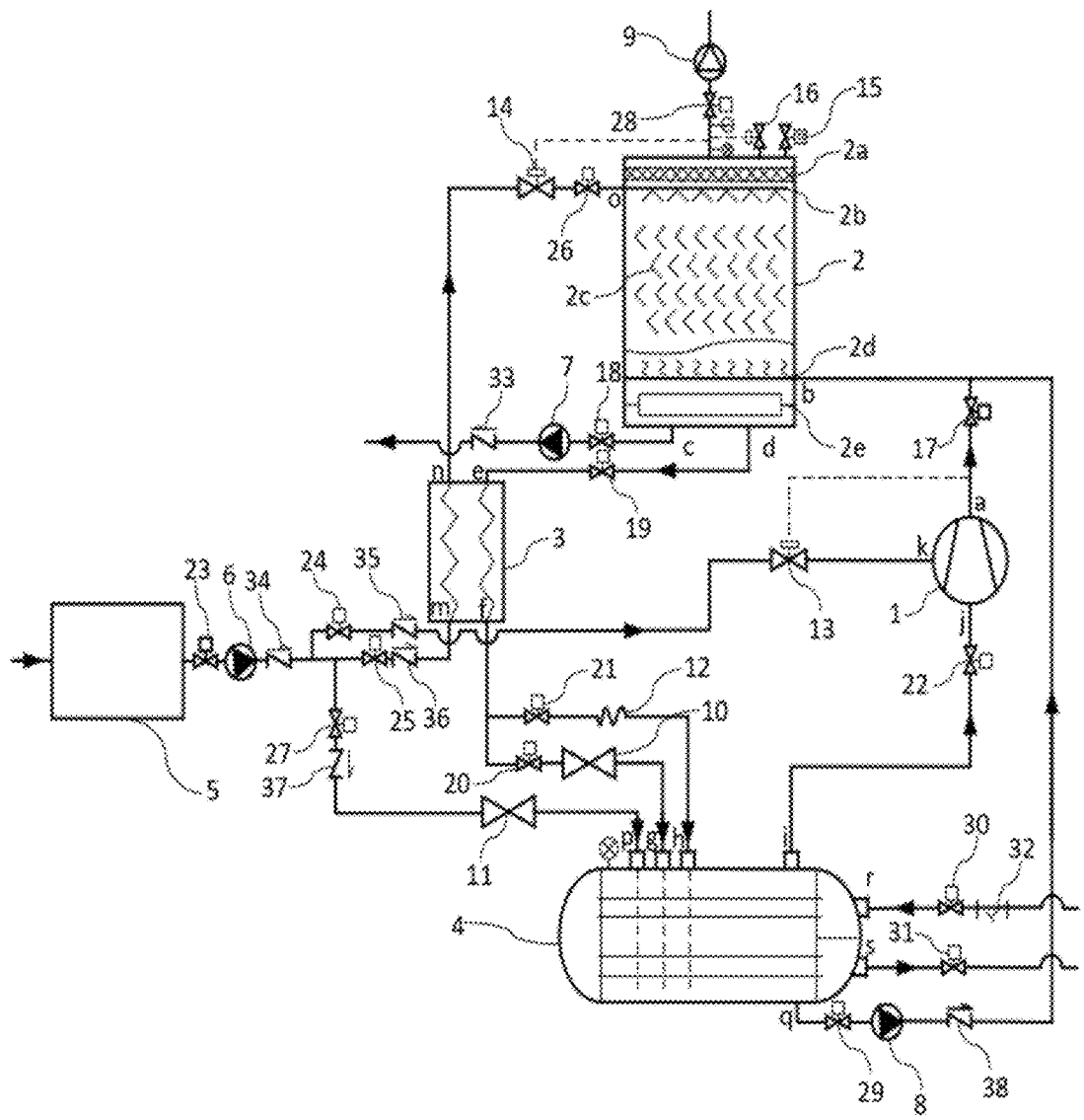
FIG. 1 is a schematic structural diagram of a semi-open high-temperature heat pump system of the present invention.

As shown in FIG. 1, a semi-open high-temperature heat pump system includes a compressor 1, a direct-contact condenser 2, a heat exchanger 3, an evaporator 4, a water purifier 5, a cold water pump 6, and a hot water pump 7. A filter screen 2a, a spray pipe 2b, a packing 2c, a steam pipe 2d, and an electric heater 2e are successively disposed from top to bottom in the direct-contact condenser 2; and a twelfth valve 28 and a vacuum pump 9 are sequentially connected at the top of the direct-contact condenser. An outlet a of the compressor 1 is sequentially connected to a first valve 17 and an inlet b of the steam pipe 2d of the direct-contact condenser 2 via a pipe. An outlet c at the bottom of the direct-contact condenser 2 is sequentially connected to a second valve 18, the hot water pump 7, and a first one-way valve 33 via a pipe to realize output to the outside. An outlet d at the bottom of the direct-contact condenser 2 is connected to a third valve 19 and then to an inlet e of the heat exchanger 3 via a pipe. An outlet f of the heat exchanger 3 is sequentially connected to a fourth valve 20 and a first throttle valve 10 and then to an inlet g of the evaporator 4 via a pipe. A steam outlet i on the top of the evaporator 4 is connected to a sixth valve 22 and then to an inlet j of the compressor 1 via a pipe.

An outlet of the water purifier 5 is sequentially connected to a seventh valve 23, the cold water pump 6, and a second one-way valve 34 via a pipe, and is then branched into three paths. One path passes through an eighth valve 24, a third one-way valve 35, and a first control valve 13, and is then connected to a water jet orifice k of the compressor 1. Another path passes through a ninth valve 25 and a fourth one-way valve 36 and is connected to an inlet m of the heat exchanger 3; and an outlet n of the heat exchanger 3 is connected to an inlet o of the spray pipe 2b of the direct-contact condenser 2 through a second control valve 14 and a tenth valve 26. The third path passes through an eleventh valve 27, a fifth one-way valve 37, and a second throttle valve 11, and is connected to an inlet p on the top of the evaporator 4.

An outlet q at the bottom of the evaporator 4 is sequentially connected to a thirteenth valve 29, a circulating water pump 8, and a sixth one-way valve 38 and then to the inlet b of the steam pipe 2d of the direct-contact condenser 2 via a pipe. A right end is connected to an inlet r of the evaporator 4 via a driving thermal source pipe successively through a filter 32 and a fourteenth valve 30; and an outlet s of the evaporator 4 outputs a driving thermal source through a fifteenth valve 31.

A safety valve 15 and a non-condensable gas vent control valve 16 are disposed on the top of the direct-contact condenser 2.

A fifth valve 21 and a capillary tube 12 are successively disposed between the outlet f of the heat exchanger 3 and an inlet h of the evaporator 4 via a pipe.

Figure 2:
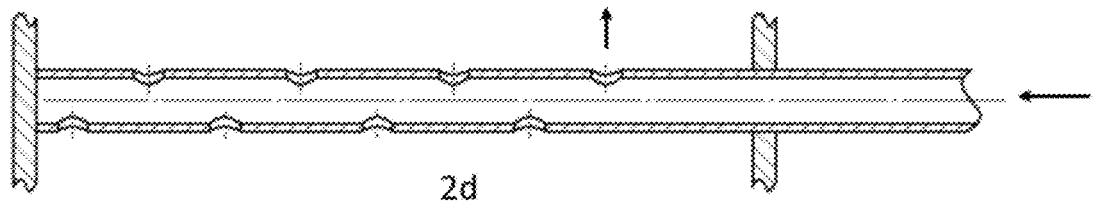
FIG. 2 is a sectional diagram of a steam pipe in the bottom of a direct-contact condenser.

The semi-open high-temperature heat pump system uses water as a circulating working fluid. A water source needs to be treated by the water purifier before being input to the system, so as to remove impurities from the working water and reduce corrosion of the working water to the system. The electric heater 2e of the direct-contact condenser 2 is power-adjustable. A tail end of the steam pipe 2d is fixedly connected to the inside of the condenser to improve the strength of the steam pipe 2d by means of a mechanical structural principle, thus ensuring stable operation of the steam pipe 2d. Further, staggered small holes (as shown in FIG. 2) are provided in a horizontal direction from the outlet to the tail end of the steam pipe 2d, so as to ensure stable output of steam and realize uniform and sufficient heat exchange. The packing 2c in the direct-contact condenser 2 can increase a gas-liquid contact time in the direct-contact condenser 2, thus ensuring uniform heat exchange.

The evaporator 4 is a shell-and-tube flooded evaporator. The circulating working water of the system flows through a shell side, so that gas-liquid separation of the working fluid can be realized under the effect of gravity, ensuring that water vapor spreads over the gas suction port of the compressor, and avoiding the compressor from carrying liquid during gas suction. The heat exchanger 3 is a plate heat exchanger or a tube-fin heat exchanger, which raises the temperature of water ejected from the direct-contact condenser 2 by recovering heat of working water flowing out of the direct-contact condenser 2, thus realizing recycling of recovered energy. Further, a subcooling degree of the working fluid entering the evaporator 4 is increased, facilitating evaporation of the working fluid in the evaporator and system circulation.

The first valve 17 to the fifteenth valve 31 are all solenoid valves, plunger type globe valves, or gate valves.

A working method of the semi-open high-temperature heat pump system is further provided, where the system has the following four working phases: A. system evacuation and filling process, B. system startup and normal operation, C. system shutdown, and D. system freeze prevention.

A. System Evacuation and Filling Process

The first valve 17, the third valve 19, the fourth valve 20, the sixth valve 22, and the twelfth valve 28 are opened simultaneously, and the vacuum pump 9 is turned on to evacuate the system to a negative pressure therein. When the pressure in the direct-contact condenser 2 meets the requirement, the vacuum pump 9 is turned off and the twelfth valve 28 is closed, to maintain a stable internal pressure of the system.

The cold water pump 6 is turned on, and the seventh valve 23 and the eleventh valve 27 are opened, so that the circulating working water treated by the water purifier 5 flows through the seventh valve 23 and the eleventh valve 27, then is throttled and depressurized by the second throttle valve 11, and is finally charged to the evaporator 4 from an inlet p on the top of the evaporator 4. The cold water pump 6 is turned off and the seventh valve 23 and the eleventh valve 27 are closed when the circulating working fluid is sufficient, thus completing filling the system with the circulating working fluid.

B. System Startup and Normal Operation

After completion of system evacuation and filling, the fourteenth valve 30 and the fifteenth valve 31 are opened, so that industrial waste heat passes through the filter 32 and the fourteenth valve 30 along a driving thermal source pipe and enters the evaporator 4 from an inlet r of the evaporator 4; and after heat exchange with the circulating working fluid, is discharged through the fifteenth valve 31 from an outlet s of the evaporator 4. The compressor 1 is turned on, so that water vapor flows from an outlet i on the top of the evaporator 4, passes through the sixth valve 22, and enters the compressor 1 from a gas suction port j of the compressor 1 to be compressed. The compressed water vapor is discharged from a discharge port a of the compressor 1, passes through the first valve 17, enters the direct-contact condenser 2 from an inlet b of the steam pipe 2d, and is ejected into the direct-contact condenser 2 via gas vents at the two sides of the steam pipe 2d. After the pressure in the direct-contact condenser 2 reaches a required value, the system enters a normal operation state. The cold water pump 6 and the hot water pump 7 are turned on, and the second valve 18, the seventh valve 23, the eighth valve 24, the ninth valve 25, and the tenth valve 26 are opened. After the working water treated by the water purifier 5 passes through the seventh valve 23 and the cold water pump 6, part of the water is ejected into the compressor 1 from a water jet orifice k of the compressor 1 through the eighth valve 24 and the first control valve 13, so as to reduce an exhaust superheat degree of the compressor and further increase a steam production. Another part of the water enters the heat exchanger 3 from an inlet m of the heat exchanger 3 through the ninth valve 25 and then flows out from an outlet n of the heat exchanger 3; and is then ejected from an inlet o of the spray pipe 2b into the direct-contact condenser 2 through the second control valve 14 and the tenth valve 26 to conduct contact heat-mass exchange with the high-temperature water vapor discharged from the steam pipe 2d, to finally form high-temperature water. Part of the high-temperature water in the direct-contact condenser 2 provides heat to a user through the second valve 18 and the hot water pump 7 via an outlet c at the bottom of the direct-contact condenser 2. Another part of the high-temperature water is discharged from an outlet d at the bottom of the direct-contact condenser 2; passes through the third valve 19, the heat exchanger 3, and the fourth valve 20; is throttled and depressurized by the first throttle valve 10; and finally enters the evaporator 4 from an inlet g on the top of the evaporator 4, to realize circulation.

C. System Shutdown

The compressor 1 is turned off; and the first valve 17, the third valve 19, the fourth valve 20, the sixth valve 22, the eighth valve 24, the fourteenth valve 30, and the fifteenth valve 31 are closed, so that the working fluid does not circulate in the system, and a low-temperature thermal source is no longer provided. The cold water pump 6 and the hot water pump 7 continuously work and absorb the waste heat in the direct-contact condenser 2. After the temperature in the direct-contact condenser 2 is reduced to a required temperature, the cold water pump 6 and the hot water pump 7 are turned off, and the second valve 18, the seventh valve 23, the ninth valve 25, and the tenth valve 26 are closed, so that the system stops operation.

D. System Freeze Prevention

When the system shuts down and the ambient temperature is too low, the electric heater 2e in the direct-contact condenser 2 and the circulating water pump 8 are turned on, and the third valve 19, the fifth valve 21, and the thirteenth valve 29 are opened, so that the working water in the evaporator 4 is discharged from an outlet q at the bottom of the evaporator 4, then passes through the thirteenth valve 29 and the circulating water pump 8, enters the direct-contact condenser 2 from the inlet b of the steam pipe 2d, and is discharged through the gas vents at the two sides of the steam pipe 2d. The working water in the direct-contact condenser 2 is discharged from the outlet d at the bottom of the direct-contact condenser 2, passes through the third valve 19 and the fifth valve 21, is throttled and depressurized by the capillary tube 12, and then enters the evaporator 4 from an inlet h on the top of the evaporator 4, so as to maintain the internal pressure of the evaporator and realize circulation. In this way, the circulating working water in the system is in a flow state, thus avoiding damage to the system due to freezing of the circulating working fluid.

An opening degree of the first control valve ahead of the water jet orifice k of the compressor 1 is adjusted in direct proportion to a superheat degree of the gas vent a of the compressor 1, so as to maintain the exhaust superheat degree of the compressor at a relatively low level and further increase a gas exhaust volume of the compressor.

In the semi-open high-temperature heat pump system, the spraying volume is adjusted and controlled by the second control valve 14. An opening degree of the second control valve 14 is adjusted in direct proportion according to the temperature of the working water in the bottom portion of the direct-contact condenser 2, and an opening degree of the non-condensable gas vent control valve 16 is adjusted in direct proportion according to the pressure in the direct-contact condenser 2.

The cold water pump 6 and the hot water pump 7 are both variable frequency pumps, and a method for adjusting the frequency or flow of the cold water pump 6 and the hot water pump 7 is adjustment in a linked manner. That is, when the frequency or flow of the hot water pump 7 increases, the frequency or flow of the cold water pump 6 also increases accordingly. The frequency of the hot water pump 7 is adjusted in direct proportion according to a demand supply for hot water.

When the system is in normal operation, the power of the electric heater 2e in the direct-contact condenser 2 is adjusted in direct proportion according to a difference value between a set temperature and an actual temperature of the hot water in the direct-contact condenser 2. When the system is in freeze prevention operation, the power of the electric heater 2e in the direct-contact condenser 2 is adjusted in inverse proportion according to the water temperature in the direct-contact condenser 2.

The above merely describes specific embodiments of the present invention. Definitely, the present invention may have other different embodiments. Those skilled in the art can make various corresponding and equivalent modifications and changes according to the present invention without departing from the spirit and essence of the present invention. These changes and modifications shall fall within the protection scope of the appended claims of the present invention.

What is claimed is:

1. A semi-open high-temperature heat pump system, comprising: a compressor, a direct-contact condenser, a heat exchanger, an evaporator, a water purifier, a cold water pump, and a hot water pump, wherein a filter screen, a spray pipe, a packing, a steam pipe, and an electric heater are successively disposed from top to bottom in the direct-contact condenser; a twelfth valve and a vacuum pump are sequentially connected at the top of the direct-contact condenser via a pipe; an outlet a of the compressor is sequentially connected to a first valve and an inlet b of the steam pipe of the direct-contact condenser via a pipe; an outlet c at the bottom of the direct-contact condenser is sequentially connected to a second valve, the hot water pump, and a first one-way valve via a pipe to realize output to the outside; an outlet d at the bottom of the direct-contact condenser is connected to a third valve and then to an inlet e of the heat exchanger via a pipe; an outlet f of the heat exchanger is sequentially connected to a fourth valve and a first throttle valve and then to an inlet g of the evaporator via a pipe; and a steam outlet i on the top of the evaporator is connected to a sixth valve and then to an inlet j of the compressor via a pipe;

an outlet of the water purifier is sequentially connected to a seventh valve, the cold water pump, and a second one-way valve via a pipe, and is then branched into three paths, wherein one path passes through an eighth valve, a third one-way valve, and a first control valve, and is then connected to a water jet orifice k of the compressor; another path passes through a ninth valve and a fourth one-way valve and is connected to an inlet m of the heat exchanger; and an outlet n of the heat exchanger is connected to an inlet o of the spray pipe of the direct-contact condenser through a second control valve and a tenth valve; and the third path passes through an eleventh valve, a fifth one-way valve, and a second throttle valve, and is connected to an inlet p on the top of the evaporator; and an outlet q at the bottom of the evaporator is sequentially connected to a thirteenth valve, a circulating water pump, and a sixth one-way valve and then to the inlet b of the steam pipe of the direct-contact condenser via a pipe; and a right end is connected to an inlet r of the evaporator via a driving thermal source pipe successively through a filter and a fourteenth valve; and an outlet s of the evaporator outputs a driving thermal source through a fifteenth valve.

2. The semi-open high-temperature heat pump system according to claim 1, wherein a safety valve and a non-condensable gas vent control valve are disposed on the top of the direct-contact condenser.

3. The semi-open high-temperature heat pump system according to claim 1, wherein a fifth valve and a capillary tube are successively disposed between the outlet f of the heat exchanger and an inlet h of the evaporator via a pipe.

4. The semi-open high-temperature heat pump system according to claim 1, wherein the evaporator is a shell-and-tube flooded evaporator in which circulating working water of the system flows through a shell side; and the heat exchanger is a plate heat exchanger or a tube-fin heat exchanger.

5. The semi-open high-temperature heat pump system according to claim 1, wherein the first valve to the fifteenth valve are all solenoid valves, plunger type globe valves, or gate valves.

6. A working method of a semi-open high-temperature heat pump system, comprising:
   1) system evacuation and filling process simultaneously opening a first valve, a third valve, a fourth valve, a sixth valve, and a twelfth valve, and turning on a vacuum pump to evacuate the system to a negative pressure therein; and when the pressure in a direct-contact condenser reaches the negative pressure, turning off the vacuum pump and closing the twelfth valve, to maintain a stable internal pressure of the system; and turning on a cold water pump, and opening a seventh valve and an eleventh valve, so that circulating working water treated by a water purifier flows through the seventh valve and the eleventh valve, then is throttled and depressurized by a second throttle valve, and is finally charged to an evaporator from an inlet p on the top of the evaporator; and turning off the cold water pump and closing the seventh valve and the eleventh valve when the circulating working fluid is sufficient, thus completing filling the system with the circulating working fluid;
   2) system startup and normal operation after completion of system evacuation and filling, opening a fourteenth valve and a fifteenth valve, so that industrial waste heat passes through a filter and the fourteenth valve and enters the evaporator from an inlet r of the evaporator, and is discharged through the fifteenth valve from an outlet s of the evaporator after heat exchange with the circulating working fluid; turning on a compressor, so that water vapor flows from an outlet i on the top of the evaporator, passes through the sixth valve, and enters the compressor from a gas suction port j of the compressor to be compressed; discharging the compressed water vapor from a gas vent a of the compressor, which then passes through the first valve, enters the direct-contact condenser from an inlet b of the steam pipe, and is ejected into the direct-contact condenser via gas vents at the two sides of the steam pipe; after the pressure in the direct-contact condenser reaches a required value, turning on the cold water pump and a hot water pump, and opening a second valve, a seventh valve, an eighth valve, a ninth valve, and a tenth valve; after the working water treated by the water purifier passes through the seventh valve and the cold water pump, ejecting part of the water into the compressor from a water jet orifice k of the compressor through the eighth valve and a first control valve; another part of the water entering a heat exchanger from an inlet m of the heat exchanger through the ninth valve and then flowing out from an outlet n of the heat exchanger; then ejecting this part of water from an inlet o of a spray pipe into the direct-contact condenser through a second control valve and the tenth valve to conduct contact heat-mass exchange with the high-temperature water vapor discharged from the steam pipe, to finally form high-temperature water; part of the high-temperature water in the direct-contact condenser providing heat to a user through the second valve and the hot water pump via an outlet c at the bottom of the direct-contact condenser; and discharging another part of the high-temperature water from an outlet d at the bottom of the direct-contact condenser, which then passes through the third valve, the heat exchanger, and the fourth valve, is throttled and depressurized by a first throttle valve, and finally enters the evaporator from an inlet g on the top of the evaporator, to realize circulation;

3) system shutdown turning off the compressor; closing the first valve, the third valve, the fourth valve, the sixth valve, the eighth valve, the fourteenth valve, and the fifteenth valve, so that the working fluid does not circulate in the system, and a low-temperature thermal source is no longer provided; the cold water pump and the hot water pump continuously working and absorbing the waste heat in the direct-contact condenser; and after the temperature in the direct-contact condenser is reduced to a required temperature, turning off the cold water pump and the hot water pump, and closing the second valve, the seventh valve, the ninth valve, and the tenth valve, so that the system stops operation; and 4) system freeze prevention when the system shuts down and the ambient temperature is too low, turning on an electric heater in the direct-contact condenser and a circulating water pump, and opening the third valve, the fifth valve, and the thirteenth valve, so that the working water in the evaporator is discharged from an outlet q at the bottom of the evaporator, then passes through the thirteenth valve and the circulating water pump, enters the direct-contact condenser from an inlet b of the steam pipe, and is discharged through the gas vents at the two sides of the steam pipe; discharging the working water in the direct-contact condenser from an outlet d at the bottom of the direct-contact condenser, which then passes through the third valve and the fifth valve, is throttled and depressurized by a capillary tube, and enters the evaporator from an inlet h on the top of the evaporator, to realize circulation, so that the circulating working water in the system is in a flow state, thus avoiding damage to the system due to freezing of the circulating working fluid.

7. The working method of a semi-open high-temperature heat pump system according to claim 6, wherein an opening degree of the first control valve ahead of the water jet orifice k of the compressor is adjusted in direct proportion to a superheat degree of the gas vent a of the compressor.

8. The working method of a semi-open high-temperature heat pump system according to claim 6, wherein an opening degree of the second control valve is adjusted in direct proportion according to the temperature of the working water in the bottom portion of the direct-contact condenser, and an opening degree of the non-condensable gas vent control valve is adjusted in direct proportion according to the pressure in the direct-contact condenser.

9. The working method of a semi-open high-temperature heat pump system according to claim 6, wherein the cold water pump and the hot water pump are both variable frequency pumps; a method for adjusting the frequency of the cold water pump and the hot water pump is adjustment in a linked manner, that is, when the frequency of the hot water pump increases, the frequency of the cold water pump also increases accordingly; and the frequency of the hot water pump is adjusted in direct proportion according to a demand supply for hot water.

10. The working method of a semi-open high-temperature heat pump system according to claim 6, wherein when the system is in normal operation, the power of the electric heater in the direct-contact condenser is adjusted in direct proportion according to a difference value between a set temperature and an actual temperature of the hot water in the direct-contact condenser; and when the system is in freeze prevention operation, the power of the electric heater in the direct-contact condenser is adjusted in inverse proportion according to the water temperature in the direct-contact condenser.

* * * * *